United States Patent [19]

Thatcher

[11] Patent Number: 5,291,408
[45] Date of Patent: Mar. 1, 1994

[54] VEHICLE TRACTION CONTROL SYSTEM

[75] Inventor: David A. Thatcher, Sterling Heights, Mich.

[73] Assignee: General Motors Corporation, Detroit, Mich.

[21] Appl. No.: 727,729

[22] Filed: Aug. 12, 1991

[51] Int. Cl.5 .......................... G06F 7/70; B60T 8/64
[52] U.S. Cl. ................... 364/426.03; 123/333; 123/481; 180/197; 303/110
[58] Field of Search ............. 364/426.03; 180/197; 123/481; 33/356

[56] References Cited

U.S. PATENT DOCUMENTS

| | | | |
|---|---|---|---|
| 3,984,748 | 10/1976 | Sullivan | 318/648 |
| 4,484,280 | 11/1984 | Brugger et al. | 364/426 |
| 4,771,851 | 9/1988 | Nystuen et al. | 180/135 |
| 4,779,696 | 10/1988 | Harada et al. | 180/197 |
| 4,844,556 | 7/1989 | Fennel et al. | 303/100 |
| 4,860,849 | 8/1989 | Andersson et al. | 180/197 |
| 4,933,856 | 6/1990 | Leiber | 364/426.01 |
| 4,941,095 | 7/1990 | Imaseki et al. | 364/424.05 |
| 5,000,281 | 3/1991 | Nobumoto et al. | 180/197 |
| 5,070,461 | 12/1991 | Nobumoto et al. | 364/426.03 |
| 5,090,511 | 2/1992 | Kabasin | 180/197 |
| 5,149,177 | 9/1992 | Fujioka et al. | 303/110 |
| 5,154,151 | 10/1992 | Bradshaw et al. | 123/481 |
| 5,161,311 | 11/1992 | Esmer et al. | 33/356 |

OTHER PUBLICATIONS

"Honda Traction Control System," Jan. 23, 1989, Honda Motor Co. Ltd., PR Division, pp. 1-10.

Primary Examiner—Thomas G. Black
Assistant Examiner—Jacques H. Louis-Jacques
Attorney, Agent, or Firm—Howard N. Conkey

[57] ABSTRACT

A traction control system limits the spin of a vehicle driven wheel at a spin limit value that is a function of the vehicle turn rate and that is decreased as a function of the vehicle turn rate of change.

5 Claims, 7 Drawing Sheets

VEHICLE TRACTION CONTROL SYSTEM

BACKGROUND OF THE INVENTION

This invention relates to a vehicle traction control system.

When driving torque is applied to a wheel of a vehicle, a longitudinal driving force is generated between the driven wheel and the road surface that is dependent upon various parameters including the road surface conditions and the amount of spin between the driven wheel and the road surface. As the value of spin increases from zero, the longitudinal driving force increases to a peak value at a critical spin value. As spin is increased beyond this value, the longitudinal driving forces decrease. Therefore, at the critical spin value, the maximum possible vehicle acceleration results. If the vehicle operator initiated engine output results in the wheel spin exceeding the critical spin the vehicle acceleration decreases from the maximum possible acceleration for the road surface condition.

It is well known to sense this excessive spin condition and limit wheel spin in the proximity of the critical spin so as to maximize vehicle longitudinal acceleration. This is accomplished by limiting the driving torque delivered to the wheels such as by applying the vehicle brakes and/or limiting the engine output torque.

It is also known that the lateral force between the vehicle wheels and the road surface is at a maximum at zero wheel spin and decreases therefrom as spin increases from zero. The result is that maximum cornering or turning capability of a vehicle is maximum at zero wheel spin and decreases therefrom as spin increases.

Accordingly, limiting wheel spin at the value producing maximum vehicle acceleration necessarily results in a decrease in the lateral force between the wheel and the road surface. In order to maximize vehicle acceleration while traveling in a straight line and to assure vehicle stability while traveling through a curved path, it has been proposed to provide a traction controller that limits wheel acceleration spin at a value producing approximately the maximum longitudinal driving force while the vehicle is traveling over a straight path and provide for more aggressive control by limiting acceleration spin at a lower spin value when the vehicle is traveling over a curved path. It has also been suggested that the reduction in the spin limit be based upon the curvature of the path as represented by, for example, steering wheel angle.

SUMMARY OF THE INVENTION

In general, this invention relates to an improved traction controller wherein traction control parameters are adjusted as a function of the rate of change of vehicle turning in order to assure vehicle stability during vehicle maneuvers such as an evasive lane change. More specifically, the parameters are adjusted to render the traction controller more aggressive for increasing values of the rate of change of vehicle turning.

In one aspect of the invention, a traction control parameter is adjusted in accord with the sum of a path curvature value and a rate of change of path curvature value.

The traction control parameter in one form of the invention is a maximum allowable wheel spin limit where wheel spin may be represented by the difference between the speeds of the driven wheel and an undriven wheel. In this form of the invention, a desired maximum wheel spin limit is reduced as a function of the rate of change of path curvature so as to render the traction control system more aggressive.

DESCRIPTION OF THE DRAWINGS

The invention may be best understood by reference to the following description of a preferred embodiment and the drawings in which.

Figure 1:
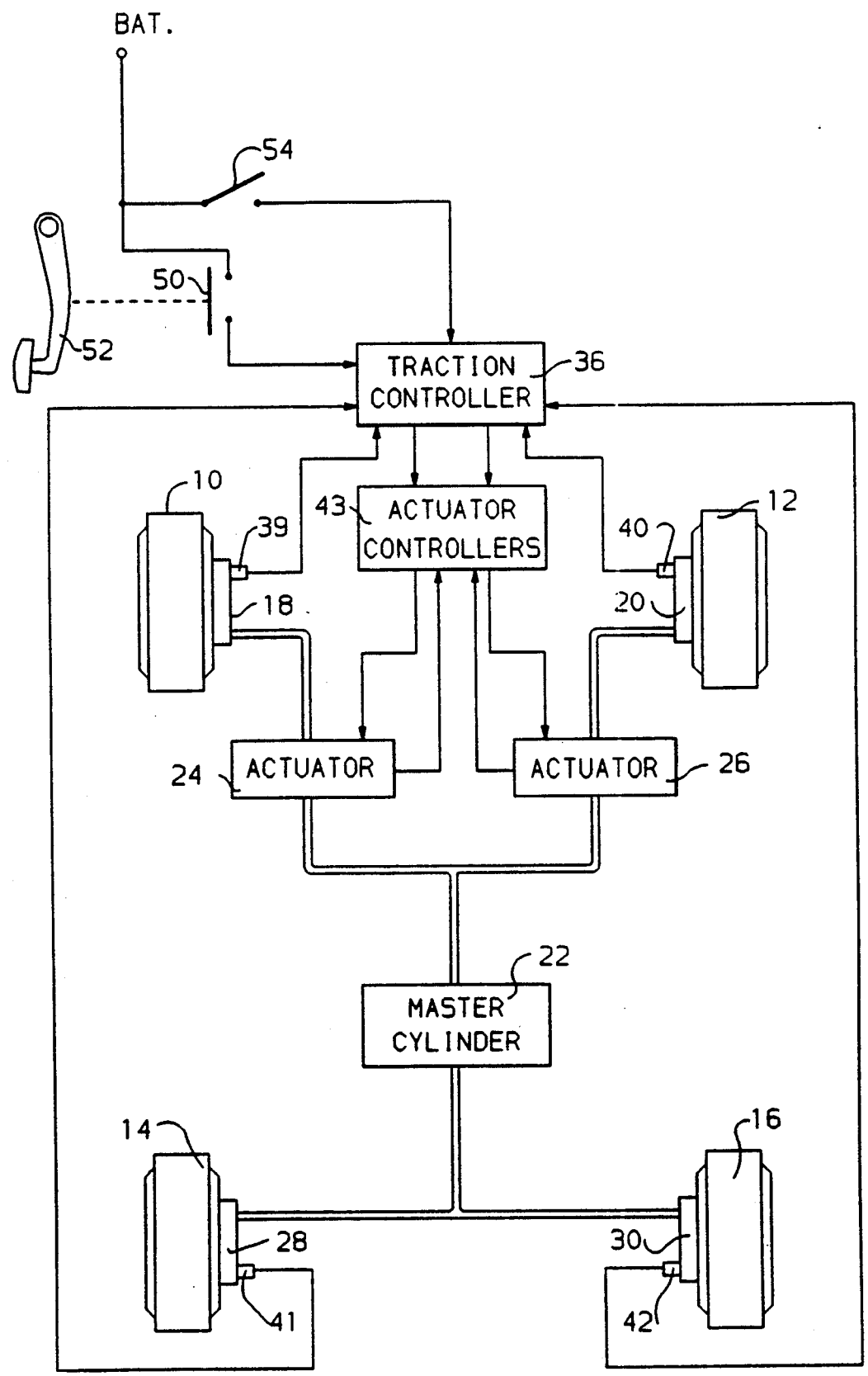
FIG. 1 is a schematic block diagram of a vehicle traction control system.

A traction control system for a front wheel drive vehicle is illustrated in FIG. 1. The vehicle has two front driven wheels 10 and 12 and two rear non-driven wheels 14 and 16. The front wheels 10 and 12 have respective hydraulic actuated brakes 18 and 20 actuated by manual operation of a conventional master cylinder 22 through a pair of traction control pressure actuators 24 and 26. As will be described, when the actuators 24 and 26 are inactive, the hydraulic fluid from the master cylinder 22 passes through the actuators 24 and 26 to the brakes 18 and 20 of the wheels 10 and 12. Thus, the actuators 24 and 26 are transparent to the braking system during normal braking of the wheels 10 and 12. Similarly, the rear wheels 14 and 16 include a pair of hydraulic actuated brakes 28 and 30 operated by hydraulic fluid under pressure from the master cylinder 22 in response to manual actuation of the brakes.

The front wheels 10 and 12 are driven via a conventional vehicle powertrain, not shown, including an internal combustion engine under control of the vehicle operator. If the engine is operated so as to deliver excessive torque to the driven wheels 10 and 12, they will experience excessive spin relative to the road surface thereby reducing the tractive force and lateral stability of the vehicle. In order to limit the acceleration spin of the driven wheels 10 and 12 resulting from excess engine output torque, a traction controller 36 is provided which limits spin by operating the brakes of the driven wheels 10 and 12.

The traction controller 36 monitors the wheel speeds of the left and right driven wheels 10 and 12 via speed sensors 39 and 40 and the wheel speeds of the left and right undriven wheels 14 and 16 via speed sensors 41 and 42 to determine whether or not an excessive spinning wheel condition exists. If such a condition is detected, the actuators 24 and 26 are operated via actuator controllers 43 for braking the left, right or both of the driven wheels 10 and 12 experiencing an excessive spinning condition.

Additional signal inputs used in controlling acceleration spin include a brake condition signal provided by a brake switch 50 closed upon actuation of the brakes of the vehicle by the conventional brake pedal 52 and a signal provided by a manually operable disable switch 54 closed to disable traction control at the option of the vehicle operator.

Figure 2:
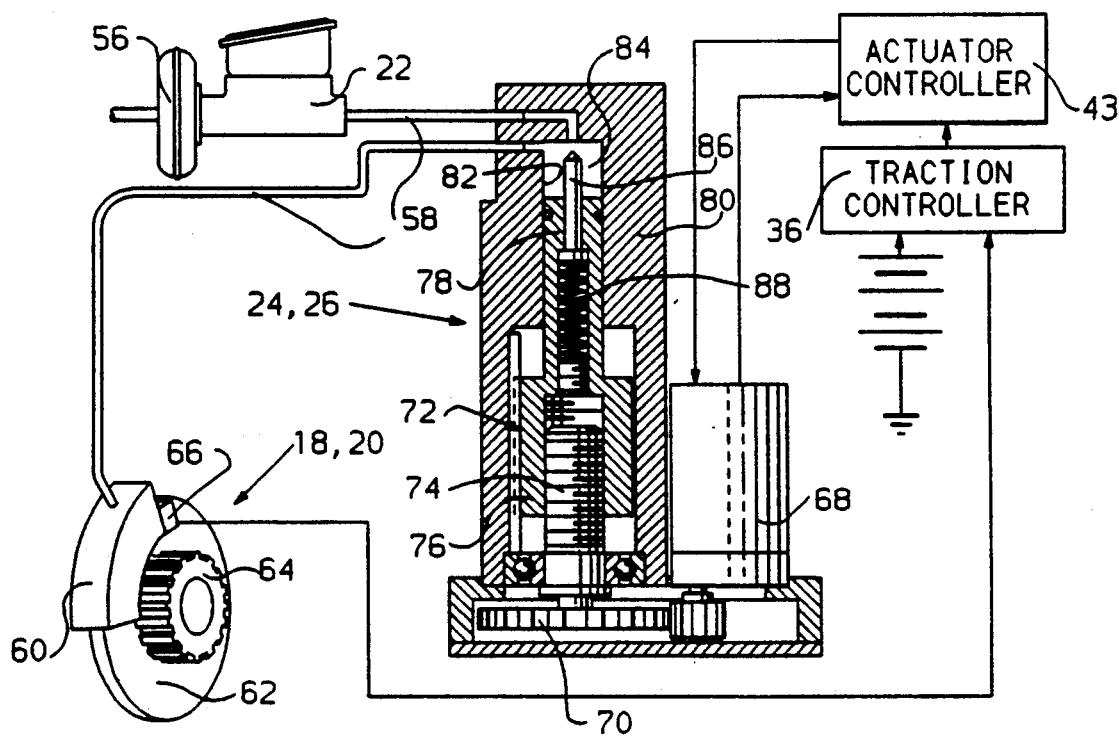
FIG. 2 is a view of the brake pressure modulator for controlling wheel brake pressure for limiting wheel spin.

Referring to FIG. 2, there is illustrated a braking system for one of the driven wheels 10 or 12 including the respective actuator 24 or 26 controlled by the traction controller 36 for limiting spin of the driven wheel. In general, the braking system is composed of a hydraulic boost unit 56 and brake lines 58 providing fluid communication with the respective wheel brake 18 or 20. The wheel brake is illustrated as a disc brake system that includes a caliper 60 located at a rotor 62 of the vehicle wheel.

A wheel speed sensing assembly at each wheel is generally comprised of an exciter ring 64 which is rotated with the wheel and an electromagnetic sensor 66 which monitors the rotation of the exciter ring to provide a signal having a frequency proportional to wheel speed. The wheel speed signals are provided to the traction controller 36 to be used to determine the wheel speed.

The respective actuator 24 or 26 is illustrated in the inactive position wherein it is transparent to the braking system. This is the actuator condition during normal vehicle braking. Each actuator in the preferred embodiment includes a DC torque motor 68 whose output shaft drives a gear train 70 whose output turns a ball screw actuator 72 comprised of a linear ball screw 74 and nut 76. As the linear ball screw rotates, the nut 76 is either extended or retracted thereby positioning a piston 78 which forms a part of the nut 76.

Each actuator includes a housing 80 in which a cylinder 82 is formed. The piston 78 is reciprocally received in the cylinder 82 and defines therewith a chamber 84. The cylinder 82 has an inlet which is connected to the master cylinder 22 and an outlet which is coupled to the brake caliper 60 of the wheel brake.

A valve member 86 is carried by and extends from the end of the piston 78. This member is spring biased within the piston 78 to an extended position as shown by a spring 88. When the piston 78 is in the retracted position illustrated, the fluid path between the master cylinder 22 and the wheel brake 18 is open. When, however, the ball screw 74 is rotated by the motor 68 to extend the nut 76 and therefore the piston 78, the valve member 86 is seated against the opening at the inlet to the chamber 84 from the master cylinder 22 to isolate the chamber 84 and the wheel brake 60 from the master cylinder 22. Once the valve 86 is seated, further extension of the piston 78 by rotation of the motor 68 then functions to pressurize the fluid at the brake 18 to apply braking forces to the wheel.

The power consumed by the DC motor 68 while controlling pressure is directly proportional to the rotational torque exerted by the motor on the gear train 70. The rotational torque is translated through the linear ball screw and nut 74 and 76 to the piston 78. The pressure present at the piston head is proportional to the wheel brake pressure. Therefore, the value of the current through the DC motor 68 is proportional to the wheel brake pressure and can be considered a measure thereof.

The ball screw actuator 72 is a high efficiency actuator so that the ball screw 74, gear train 70 and the motor output shaft are reverse driven by the hydraulic pressure acting on the piston 78 when it is greater than the torque output of the motor 68 until the hydraulic pressure is reduced to a level where it is overcome or offset by the torque output of the DC motor 68.

The traction controller 36 of FIG. 1 takes the form of a conventional general purpose digital computer programmed to control the spin of the driven wheels 10 and 12 in accord with the principles of this invention.

Figure 3:
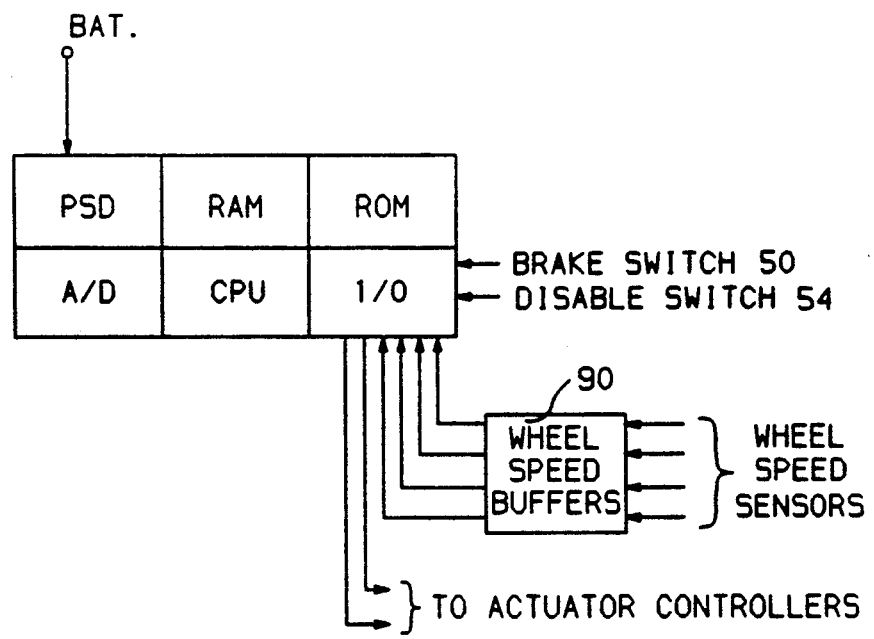
FIG. 3 is a diagram of the traction controller of FIG. 1 for applying brake pressure for control of wheel spin.

As illustrated in FIG. 3, the traction controller 36 consists of a common digital computer composed of a read-only memory (ROM), a random access memory (RAM), an analog-to-digital converter (A/D), a power supply device (PSD), a central processing unit (CPU) and an input/output section (I/O) which interfaces to a wheel speed buffer circuit 90 which functions to condition the speed signal outputs of the wheel speed sensors, the actuator controllers 43, the brake switch 50, and the disable switch 54.

The actuator controller 43 takes the form of two conventional independent closed loop motor current controllers each of which establishes the current through the motor 68 of a respective one of the actuators 24 or 26 at a level commanded by the traction controller.

The ROM of the digital computer of FIG. 3 contains the instructions necessary to implement the control algorithm as diagrammed in the FIGS. 4–7. The specific programming of the ROM for carrying out the functions depicted in the flow diagrams of FIGS. 4–7 may be accomplished by standard skill in the art using conventional information processing languages.

When power is first applied to the system from the conventional vehicle battery, the computer program is initiated. The program may first provide for initialization of various random access memory variables to calibrated values and other functions. When this initialization routine is completed, a background loop may be executed that contains various system maintenance and diagnostic routines. This loop may be interrupted by one or possibly several system interrupts whereby control will be shifted to the appropriate interrupt service routine. In this embodiment, one such system interrupt is a high frequency interrupt provided at, for example, 10 millisecond intervals whereby the interrupt routine of FIG. 4 is executed and another system interrupt is a lower frequency interrupt provided at, for example, 100 millisecond intervals during which the interrupt routine of FIG. 5 is executed.

Figure 4:
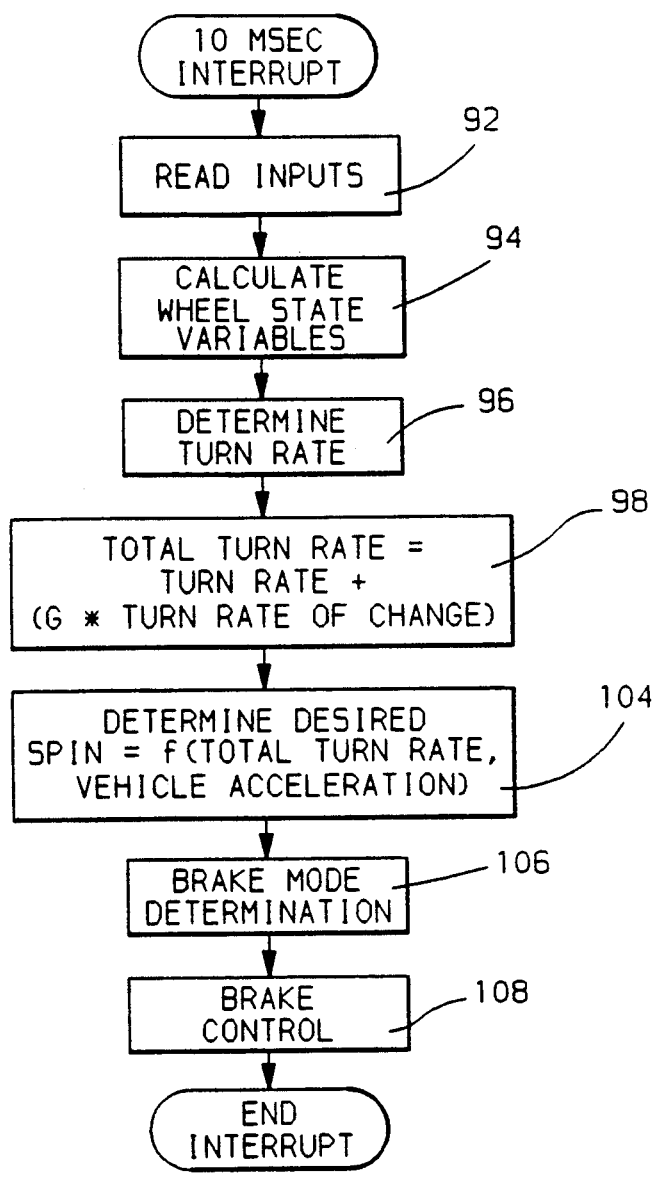
FIGS. 4, 5, 6, 7a and 7b are flow diagrams illustrating the operation of the traction controller of FIG. 1.
Figure 5:
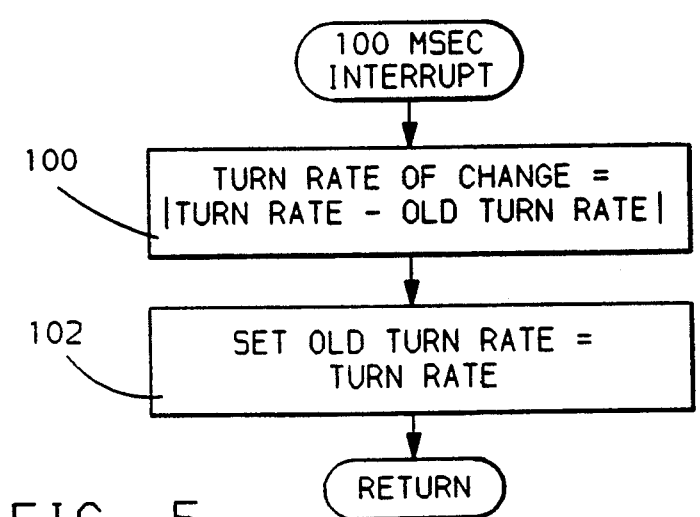

Referring to FIG. 4, the 10 millisecond interrupt routine for limiting the acceleration spin of the driven wheels 10 and 12 is illustrated. The controller first reads at step 92 the various system inputs including the left front, right front, left rear and right rear wheel speeds $V_{lf}$, $V_{rf}$, $V_{lr}$ and $V_{rr}$ and the discrete signal states including the open or closed state of the brake switch 50 and the disable switch 54.

Next, various wheel state variables are determined at step 94. The wheel state variables include filtered values of wheel speed and acceleration. The filtering may be provided by use of a standard first order lag equation. In addition, the absolute magnitude of the difference in speed of the driven and undriven wheels on the same side of the vehicle is determined by the absolute magnitude of the expressions $V_{lf}-V_{lr}$ for the left side wheels 10 and 14 and $V_{rf}-V_{rr}$ for the right side wheels 12 and 16. These difference values represent driven wheel spin based on driven and undriven wheel speeds on the same side of the vehicle wherein the speed of the undriven wheel is a measure of vehicle speed. The final wheel state variable determined is a measure of vehicle acceleration as represented, for example, by the average of the acceleration values of the undriven wheels.

Once the wheel state variables have been determined, the turn rate (turning radius) of the vehicle is determined at step 96. While other means such as a steering wheel position sensor may be used to sense vehicle turning, the turn rate of this embodiment is represented by the absolute magnitude of the difference in the speeds $V_{lr}$ and $V_{rr}$ of the left and right undriven wheels 14 and 16. While the vehicle is traveling in a straight line, the speeds will be equal. However, when the vehicle is traveling through a curve or when the vehicle operator executes a maneuver such as a lane change, the undriven wheel speeds will differ by an amount that is a measure of the vehicle turn angle.

A total turn rate term is then computed at step 98 that is the sum of the turn rate determined at step 96 and the product of a gain factor G and the turn rate of change. As will be described, this product is used to control the driven wheel acceleration spin so as to render the traction control more aggressive while the vehicle operator executes a steering maneuver. The gain factor G is a predetermined calibration value stored in ROM and in one embodiment has a value of 2. The turn rate of change is computed in the 100 millisecond interrupt routine as illustrated in FIG. 5. Referring to this FIGURE, the turn rate of change is computed at step 100 as the absolute magnitude of the difference between the last determined value of turn rate at step 98 and a saved prior (old) turn rate value. At the next step 102, the last determined turn rate utilized at step 100 is saved as the old turn rate which will be used at the step 100 during the next execution of the routine of FIG. 5 in determining the turn rate of change.

Figure 8:
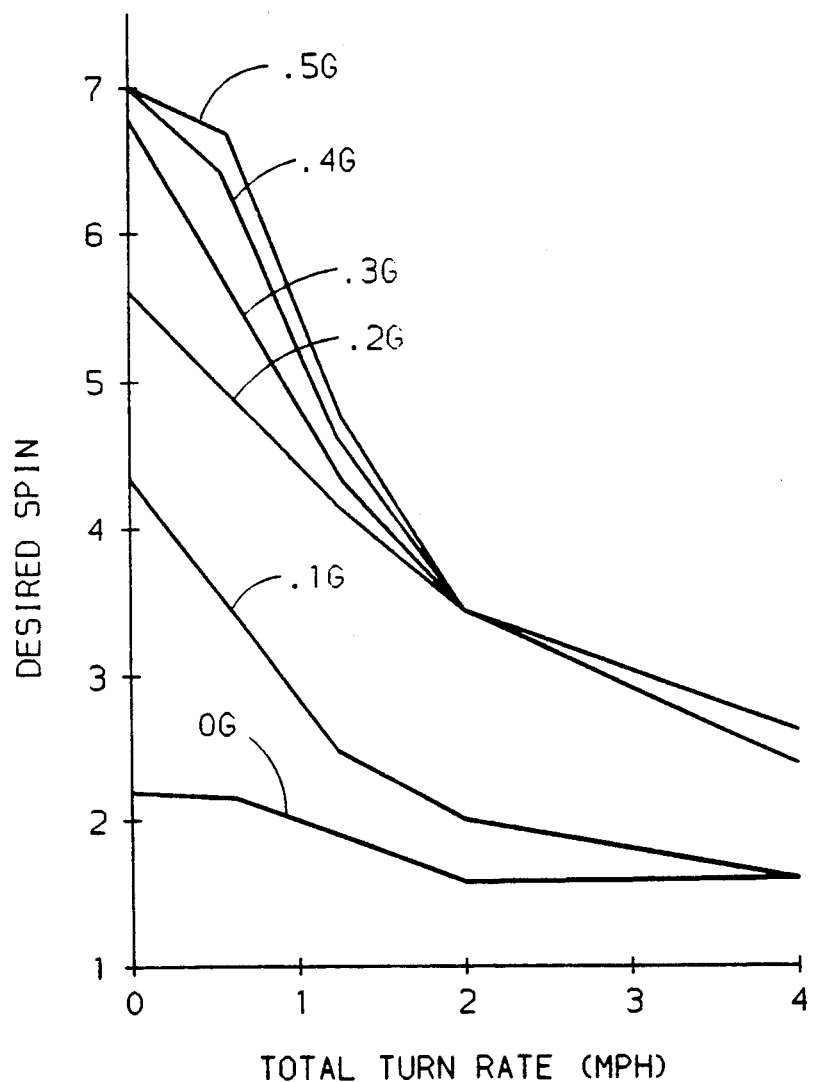
FIG. 8 is a graph illustrating the control principles of this invention.

Returning to FIG. 4, step 104 next determines a desired driven wheel spin limit wherein driven wheel spin is represented by the speed difference between the driven and undriven wheels on the same side of the vehicle as computed at step 94. The desired spin limit is a predetermined function of the total turn rate computed at step 98 and vehicle acceleration as computed at step 94. In this embodiment, the desired speed difference (spin limit) is obtained from a lookup table stored in ROM wherein speed limit values are stored as a function of total turn rate and vehicle acceleration values. FIG. 8 represents the stored values in one embodiment. As seen in this FIGURE, the desired spin limit increases with increasing values of vehicle acceleration. This provides for the allowance of higher values of acceleration wheel spin on higher coefficient of friction road surfaces. Further, it can be seen that at any given vehicle acceleration value, the spin limit decreases from a peak value at zero total turn rate with increasing values of the total turn rate. The peak value represents a condition of straight line vehicle travel (zero turn rate) with no turning input by the vehicle operator (zero turn rate of change). Importantly and in accord with this invention, the spin limit represented by the stored velocity difference values varies as an inverse function of the magnitude of the turn rate of change since the magnitude of the total turn rate is increased by the turn rate of change value resulting in a decrease in the corresponding spin limit. Accordingly, the traction controller in limiting spin at the desired spin limit velocity difference retrieved from the lookup table results in a more aggressive spin control as the magnitude of the turn rate of change increases.

At the next step 106, the program determines the proper mode of operation of the brake actuators. This step is described in detail in reference to FIG. 5. Then at step 108, the output current commands are determined and provided to the actuator controllers for limiting wheel spin to the appropriate values. This step is described in detail in reference to FIGS. 7a and 7b.

Figure 6:
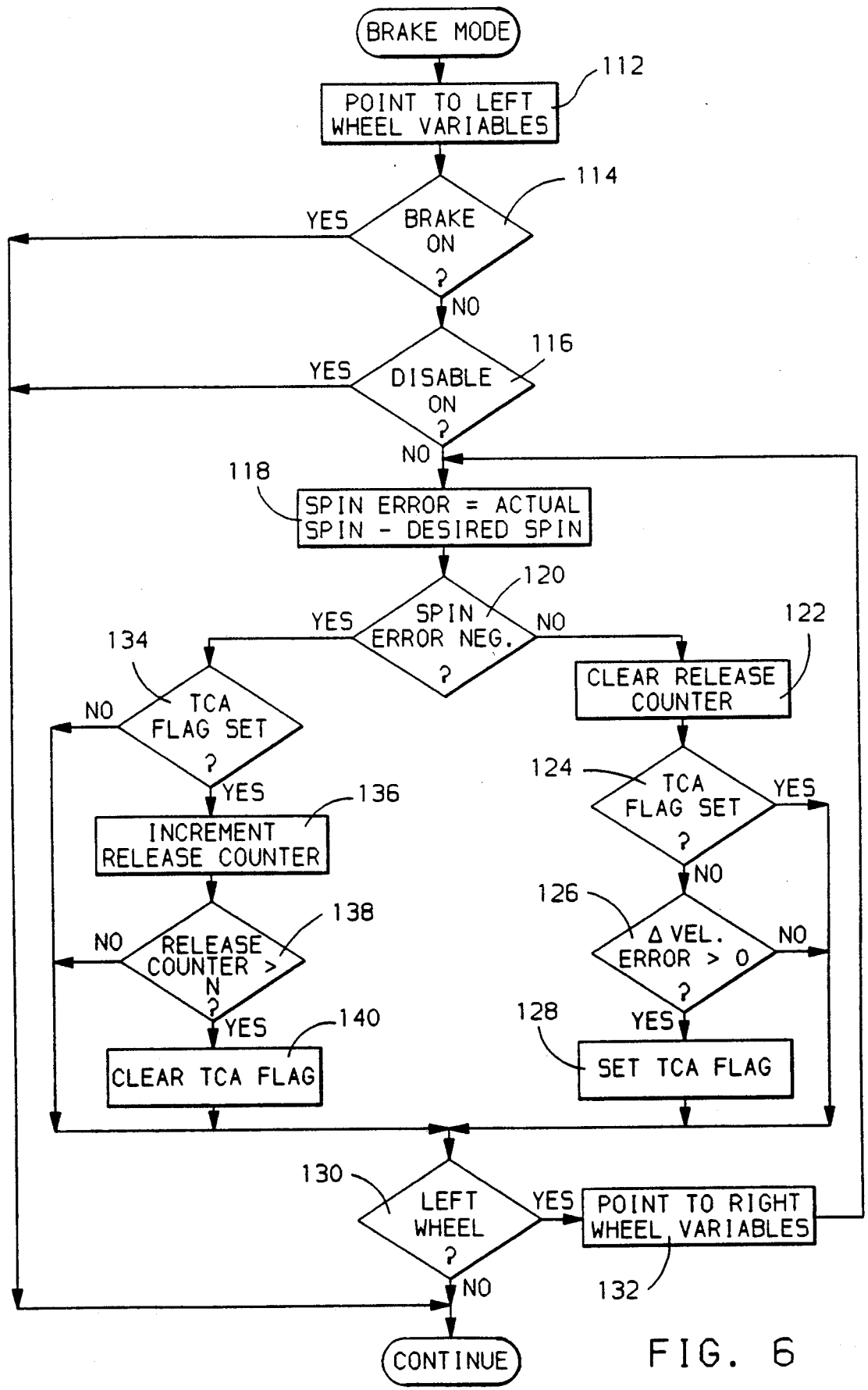

The brake mode determination routine 106 will now be described with reference to FIG. 6. At this point, it should be noted that unless a program function specifically relates to both wheels, the routine is selectively conditioned for performing steps associated with one or the other left or right driven wheel 10 or 12. Accordingly, parameters associated with one of the driven wheels are selected depending upon which wheel the routine is conditioned for. It will be assumed that the routine is first conditioned for the left driven wheel 10 at step 112.

The program next evaluates the status of the brake switch 50 at step 114 and the status of the manually operated disable switch 54 at step 116. The sensed closure of either one of these switches represents a condition not requiring acceleration spin control and the program exits the interrupt routine. However, if neither of the switches 50 and 54 is closed, the program continues to evaluate the wheel variables to determine if brake actuation is required.

An excessive acceleration spin condition is represented for the wheel if the actual wheel spin represented by the difference in the velocity of the wheel and the velocity of the undriven wheel on the same side of the vehicle is greater than the desired spin limit determined at step 104 of FIG. 4. In this regard, the wheel spin error is determined at step 118 by subtracting the desired spin limit determined at step 104 from the actual wheel spin computed at step 94. If the error is not negative as determined at a step 120, a release counter is cleared at step 122 after which a traction control active (TCA) flag is checked at step 124 to determine if wheel spin control by brake pressure application is already active. If not set then the program determines if traction control should be requested based on whether or not the spin error determined at step 118 is greater than zero. This determination is made at step 126. If the spin error is greater than zero, traction control is requested by setting the TCA flag at step 128.

If the TCA flag is already set (step 124) or has just been set (step 128), the program determines at step 130 if it is presently conditioned for the left wheel and if so, advances to the right wheel by pointing to the right wheel variables at a step 132. Following step 132, the program returns to step 118 and continues while using the right wheel variables and parameters.

Returning to step 120, if the spin error is determined to be negative, indicating wheel spin is not excessive and a step 134 senses that the TCA flag is set, the program checks whether the TCA flag should be cleared to terminate traction control. In this embodiment the TCA flag is cleared to effect termination of traction control when the spin error is negative for a specified amount of time represented by N interrupt intervals. This timing function is provided by incrementing the release counter at step 136 and comparing the resulting count with the value N at step 138. If the count is greater than N, the TCA flag is cleared at step 140, otherwise, the step 140 is bypassed. Whenever step 134 senses that the TCA flag is already cleared, the steps 136–140 are bypassed. If step 134 indicates the TCA flag is cleared or if the flag is set at step 140, the program advances to the right wheel via the steps 130 and 132 or to the next routine.

Figure 7A:
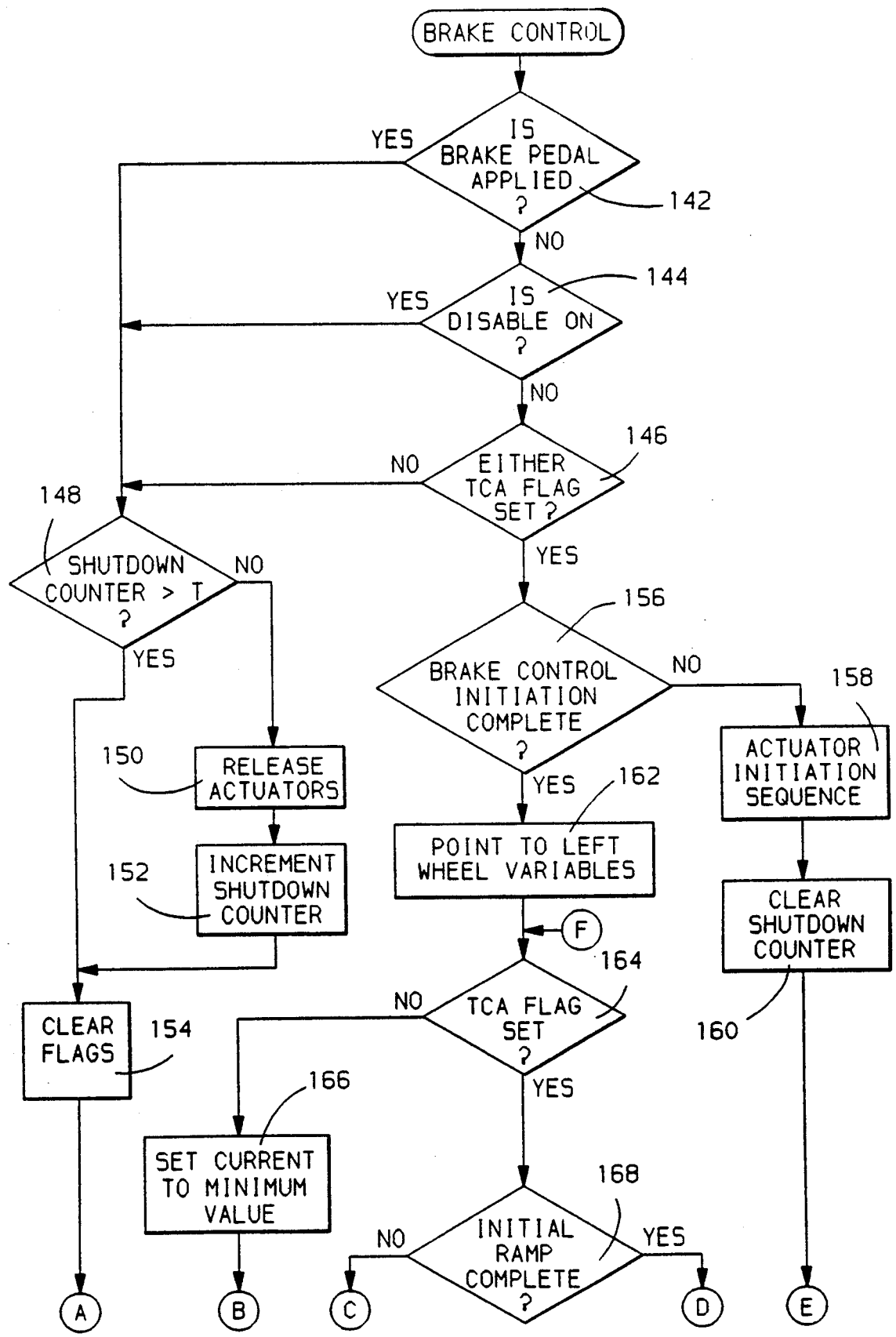
Figure 7B:
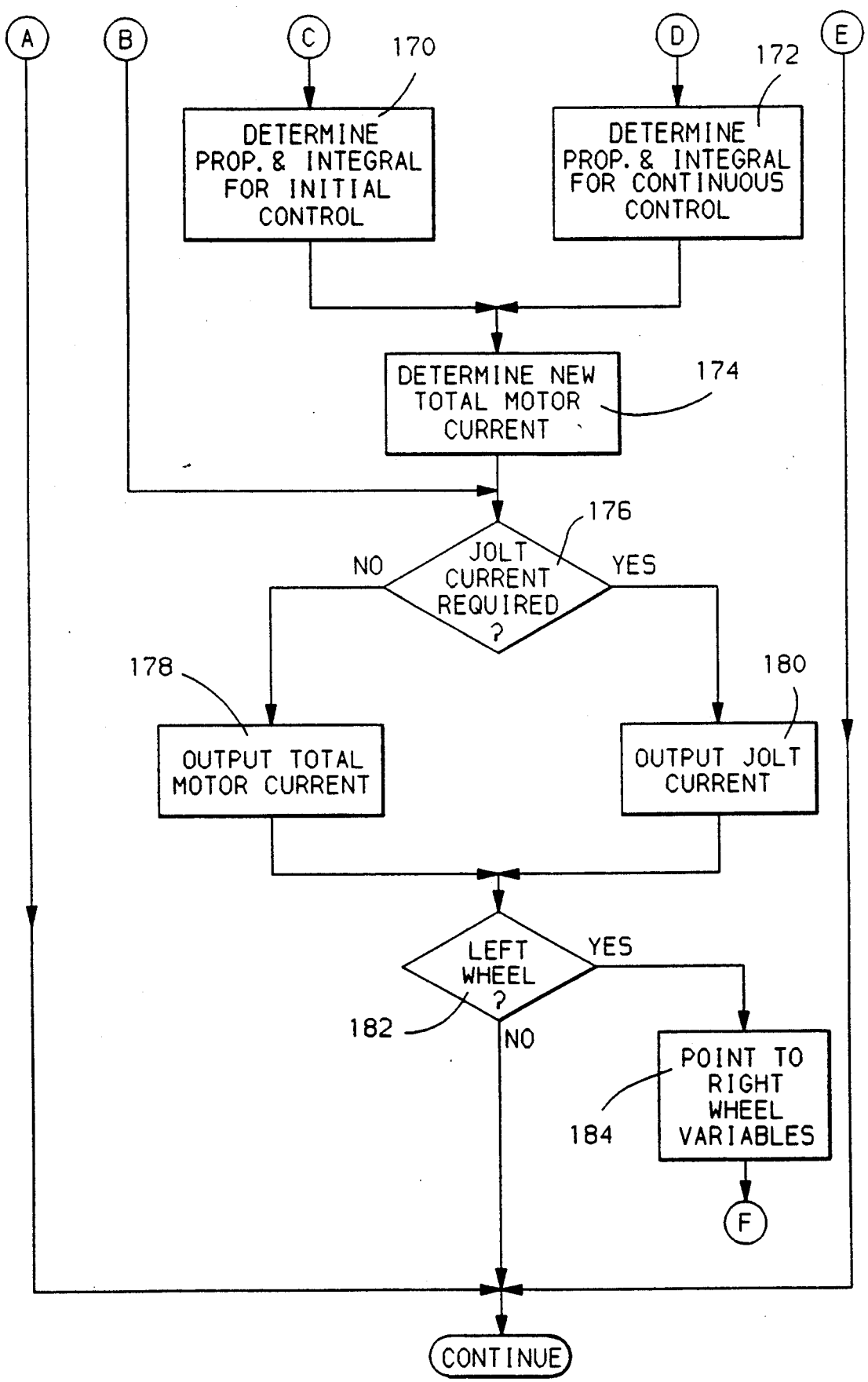

Upon completion of the mode determination routine, the brake control routine 108 is executed and is illustrated in detail in FIGS. 7a and 7b. The brake control routine first checks for brake pedal application at step 142, a disable condition at step 144 or the lack of either wheel's TCA flag being set at step 146. If any of those conditions are satisfied, brake pressure from both actuators will be released. This is done by applying reverse current to both brake actuator motors for a set period of time represented by T interrupt intervals. This is accomplished by checking the value of a shutdown counter at step 148. If not greater than the value T, the actuators 24 and 26 are retracted by commanding reverse current to the actuators at step 150. The shutdown counter is then incremented at step 152. The reverse current on the brake motors returns the pistons 78 in the actuators 24 and 26 to their home positions and opens valves 86, allowing normal braking function. When the actuators have been retracted for the time T, the steps 150 and 152 are bypassed. All flags used in brake control are then cleared at the next step 154.

If step 142 determines that the brake pedal 52 is not actuated, step 144 determines that the disable switch 54 is open and if step 146 determines that either TCA flag is set, the program checks for completion of an initiation sequence at step 156. In the initiation sequence, a predetermined motor current command for each of the motors 68 of the actuators 24 and 26 is established for a predetermined amount of time. This is done to remove the brake system compliance and to ready the actuators 24 and 26 for control of the brake pressure to the wheel brakes 18 and 20. During initiation, the shutdown counter used at steps 148-152 to time the complete release of traction brake pressure is also cleared at step 160. If initiation is complete, brake actuator command currents are then determined for each actuator before the routine is completed.

As with other routines, when the brake control initiation is complete as sensed at step 156, control parameters are first determined for the left wheel, followed by the right wheel. The left wheel is pointed to at step 162 to condition the routine for the left wheel with its related parameters.

Brake motor command currents are determined in one of three ways. If step 164 determines the TCA flag is not set for the selected wheel, the motor current command is set to a minimum value at step 166 to ensure that the brake compliance removed in the initiation sequence at step 148 does not return. If the TCA flag is set, the program proceeds from step 164 to a step 168 where completion of an initial 'ramp' of a brake integral term is checked. If the initial ramp has not been completed a step 170 is executed to ramp an integral pressure control term. This function occurs immediately after the actuator initiation sequence of step 158 is completed. It allows the brake control integral current command terms to increase to some value. The value is determined (the ramp ends) when the acceleration of the spinning wheel is found to be below a set threshold at the same time that the jerk for that wheel is negative. This ramp control allows for rapid estimation of the integral term portion of the brake control current command in absence of specific information about the tire/road interface. In one embodiment, the ramp rate may be made a function of the engine throttle position. Further, proportional brake pressure current command terms may be initialized at values based on throttle position.

After the initial ramp is complete, brake control integral and proportional current command terms are thereafter derived at step 172 based upon the spin error determined at step 118 to determine the current command to the motor 68 and therefore brake pressure to the wheel brake. The proportional term is the product of a proportional gain factor and the spin error. An integral correction value is computed as the product of an integral gain factor and the spin error. The integral term determined at step 172 is then the sum of the prior integral term and the integral correction value.

Following step 170 or 172, step 174 determines the total motor current command by summing together the proportional and integral terms. Assuming that the next step 176 determines that a jolt current is not required, the determined motor current is commanded at step 178 to the appropriate actuator controller 43.

A jolt current is periodically outputted to the motors 68 via steps 176 and 180 to help overcome seal friction in the actuators 24 and 26, ensuring the desired linear relationship between brake actuator current and brake pressure. A jolt current is considered required by step 176 if the determined motor current remains in any state (increasing, decreasing or constant) for three interrupt intervals or if there has been a change from one of the states to another.

From step 178 or 180, step 182 determines if the routine is conditioned for the left wheel and if so, points to the right wheel variables at step 184 after which the routine returns to step 164 and continues thereby controlling the brake pressure to the right wheel based on spin error in the same manner previously described in relation to the left wheel. When the routine is completed for the right wheel, the routine is exited.

Repeated executions of the routine of FIG. 7 provides for the establishment of a commanded motor current via steps 172 and 174 that reduces the spin error to zero thereby arresting an excessive spin condition and limiting the wheel spin at the desired spin limit set at step 104 of FIG. 4.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A method of traction control for a vehicle having an engine for applying a driving torque to a vehicle wheel, the method comprising the steps of:
   measuring wheel speed;
   measuring vehicle speed;
   determining the spin value of the vehicle wheel in accord with a predetermined function of the wheel speed and vehicle speed;
   determining vehicle turn rate of change;
   reducing the driving torque applied to the vehicle wheel when the determined spin value is greater than a threshold spin value representing an excessive wheel spin condition;
   decreasing the threshold spin value in an inverse relation to the determined vehicle turn rate of change.

2. The method of claim 1 wherein the predetermined function of the wheel speed and the vehicle speed is a difference between the wheel speed and the vehicle speed.

3. A method of traction control for a vehicle having an engine for applying a driving torque to a vehicle wheel, the method comprising the steps of:

measuring wheel speed;
measuring vehicle speed;
determining a spin value of the vehicle wheel in accord with a predetermined function of the wheel speed and vehicle speed;
determining a vehicle turn rate;
determining vehicle turn rate of change;
setting a spin threshold representing an excessive spin condition at a value that is a predetermined function of a sum of the absolute value of the vehicle turn rate and the vehicle turn rate of change, the predetermined function providing for an inverse relationship between the spin threshold and the sum; and
reducing the driving torque applied to the vehicle wheel when the determined spin value is greater than the spin threshold.

4. A method of traction control for a vehicle having a driven wheel, an undriven wheel and an engine for applying a driving torque to the driven wheel, the method comprising the steps of:
measuring the undriven wheel speed $V_r$;
measuring the driven wheel speed $V_f$;
determining vehicle turn rate of change;
reducing the driving torque applied to the vehicle wheel when an amount that $V_f$ exceeds $V_r$ is greater than a threshold spin value representing an excessive wheel spin condition;
decreasing the threshold spin value in an inverse relation to the determined vehicle turn rate of change.

5. A method of traction control for a vehicle having a driven wheel, an undriven wheel and an engine for applying a driving torque to the driven wheel, the method comprising the steps of:
measuring the undriven wheel speed $V_r$;
measuring the driven wheel speed $V_f$;
determining vehicle turn rate;
determining vehicle turn rate of change;
determining a total turn rate in accord with the expression: (absolute value of vehicle turn rate)+(G * absolute value of vehicle turn rate of change), where G is a predetermined gain constant;
determining a spin threshold value in accord with a predetermined function of the total turn rate, the predetermined function providing for varying the determined spin threshold value in an inverse relation to the value of the total turn rate;
reducing the driving torque applied to the wheel when an amount that $V_f$ exceeds $V_r$ is greater than the spin threshold value.

* * * * *